United States Patent
Malkov

(10) Patent No.: US 12,526,035 B2
(45) Date of Patent: Jan. 13, 2026

(54) BEAMFORMING FOR INTERFERENCE SUPPRESSION

(71) Applicant: Nokia Solutions and Networks Oy, Espoo (FI)

(72) Inventor: Andrei Malkov, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 27 days.

(21) Appl. No.: 18/419,289

(22) Filed: Jan. 22, 2024

(65) Prior Publication Data

US 2024/0259080 A1 Aug. 1, 2024

(30) Foreign Application Priority Data

Jan. 31, 2023 (FI) .................................... 20235087

(51) Int. Cl.
| | | |
|---|---|---|
| H04L 23/02 | (2006.01) | |
| H04B 7/06 | (2006.01) | |
| H04B 7/08 | (2006.01) | |

(52) U.S. Cl.
CPC ....... H04B 7/0857 (2013.01); H04B 7/06966 (2023.05)

(58) Field of Classification Search
CPC .. H04B 7/0617; H04B 7/0634; H04B 17/345; H04B 7/06966; H04L 1/0025; H04L 5/0026; H04W 52/244; H04W 52/281; H04W 72/283; H04W 72/1273
USPC .................................. 375/262, 260, 267, 299
See application file for complete search history.

(56) References Cited

U.S. PATENT DOCUMENTS

| | | | |
|---|---|---|---|
| 2006/0292994 A1* | 12/2006 | Oura .................... | H04B 7/0617 455/63.4 |
| 2014/0133523 A1 | 5/2014 | Xu et al. | |
| 2015/0092621 A1 | 4/2015 | Jalloul et al. | |
| 2018/0006690 A1 | 1/2018 | Shepard et al. | |
| 2020/0059271 A1 | 2/2020 | Kuutela et al. | |
| 2021/0235434 A1* | 7/2021 | Raghavan ........... | H04W 72/046 |
| 2021/0351832 A1 | 11/2021 | Zhang et al. | |
| 2022/0078811 A1* | 3/2022 | Sundararajan ........ | H04W 72/23 |

(Continued)

FOREIGN PATENT DOCUMENTS

CN   115443617 A   12/2022

OTHER PUBLICATIONS

Extended European Search Report received for corresponding European Patent Application No. 24152508.8, dated Jul. 15, 2024, 11 pages.

(Continued)

*Primary Examiner* — Khai Tran
(74) *Attorney, Agent, or Firm* — Nokia Technologies Oy

(57) ABSTRACT

Systems, methods, apparatuses, and computer program products for interference reduction. One method may include calculating at least one downlink beamforming coefficients vector, and estimating at least one channel coefficient. Interference may be calculated, and a configuration may be selected based upon a determination of interference power. The transformed beamforming coefficients vector may be calculated by at least one of minimizing maximum interference power over one or more uplink antenna elements, minimizing mean interference power over one or more uplink antenna elements, or minimizing interference power based on uplink beamforming.

17 Claims, 14 Drawing Sheets

(56) References Cited

U.S. PATENT DOCUMENTS

2022/0109550 A1     4/2022   Bai et al.
2024/0129945 A1*    4/2024   Abdelmonem ...... H04B 7/0695

OTHER PUBLICATIONS

"Discussion on subband non-overlapping full duplex", 3GPP TSG-RAN WG1 Meeting #109-e, R1-2203157, Agenda Item: 9.3.2, Huawei, May 9-20, 2022, 9 pages.

"Feasibility and techniques for Subband non-overlapping full duplex ", 3GPP TSG RAN WG1, Meeting #110, R1-2207231, Agenda item: 9.1.3.1, Qualcomm Incorporated, Aug. 22-26, 2022, pp. 1-28.

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"3rd Generation Partnership Project; Technical Specification Group Radio Access Network; NR; Physical channels and modulation (Release 17)", 3GPP TS 38.211, V17.2.0, Jun. 2022, pp. 1-136.

"3rd Generation Partnership Project; Technical Specification Group Radio Access Network; NR; Multiplexing and channel coding (Release 17)", 3GPP TS 38.212, V17.2.0, Jun. 2022, pp. 1-201.

"3rd Generation Partnership Project; Technical Specification Group Radio Access Network; NR; Physical layer procedures for control (Release 17)", 3GPP TS 38.213, V17.2.0, Jun. 2022, pp. 1-256.

"3rd Generation Partnership Project; Technical Specification Group Radio Access Network; NR; Physical layer measurements (Release 17)", 3GPP TS 38.215, V17.1.0, Mar. 2022, pp. 1-26.

"Revised SID: Study on evolution of NR duplex operation", 3GPP TSG RAN Meeting #95-e, RP-220633, Agenda: 9.2.3, CMCC, Mar. 17-23, 2022, 5 pages.

"On the evaluation methodology for NR duplexing enhancements", 3GPP TSG RAN WG1 #109, R1-2204430, Agenda: 9.3.1, Nokia, May 9-20, 2022, 9 pages.

"Feasibility and techniques for Subband non-overlapping full duplex", 3GPP TSG RAN WG1 #109-e, R1-2205031, Agenda: 9.1.3.1, Qualcomm Incorporated, May 9-20, 2022, pp. 1-20.

"RF considerations of dynamic TDD and SBFD", 3GPP TSG RAN WG1 #109, R1-2204433, Agenda: 9.3.4, Nokia, May 9-20, 2022, 12 pages.

"3rd Generation Partnership Project; Technical Specification Group Radio Access Network; Study on channel model for frequencies from 0.5 to 100 GHZ (Release 17)", 3GPP TR 38.901, V17.0.0, Mar. 2022, pp. 1-98.

Kolodziej et al., "In-Band Full-Duplex Technology: Techniques and Systems Survey", IEEE Transactions on Microwave Theory and Techniques, vol. 67, No. 7, Jul. 2019, pp. 3025-3041.

Everett et al., "SoftNull: Many-antenna full-duplex wireless via digital beamforming", IEEE Transactions on Wireless Communications, vol. 15, No. 12, Dec. 2016, pp. 8077-8092.

Bliss et al., "Simultaneous transmission and reception for improved wireless network performance", IEEE/SP 14th Workshop on Statistical Signal Processing, Aug. 26-29, 2007, pp. 478-482.

Office action received for corresponding Finnish Patent Application No. 20235087, dated May 19, 2023, 11 pages.

"3rd Generation Partnership Project; Technical Specification Group Radio Access Network; NR; Physical layer procedures for data (Release 17)", 3GPP TS 38.214, V17.4.0, Dec. 2022, pp. 1-231.

Office action received for corresponding Finnish Patent Application No. 20235087, dated Nov. 13, 2023, 6 pages.

Office action received for corresponding Chinese Patent Application No. 202410118970.5, dated Dec. 3, 2024, 6 pages of office action and 3 pages of translation available.

* cited by examiner

BEAMFORMING FOR INTERFERENCE SUPPRESSION

TECHNICAL FIELD

Some example embodiments may generally relate to systems and methods for reducing interference in mobile or wireless telecommunication systems.

BACKGROUND

Examples of mobile or wireless telecommunication systems may include 3rd Generation Partnership Project (3GPP) Long Term Evolution (LTE), 5th generation (5G) radio access technology (RAT), new radio (NR) access technology, 6th generation (6G), and/or other communications systems. In some instances, example mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture.

A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the radio access network (RAN) for 5G, which may provide radio access for NR, LTE, and LTE-A.

It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include determining an interference channel matrix of an antenna array having a plurality of uplink antenna elements and a plurality of downlink antenna elements. The method may further include determining an untransformed beamforming coefficients vector. The method may further include determining a transformed beamforming coefficients vector using the untransformed beamforming coefficients vector and the interference channel matrix. The method may further include determining an interference of the plurality of the uplink antenna elements and the plurality of the downlink antenna elements using the transformed beamforming coefficients vector and determining a power of the interference of the plurality of the uplink antenna elements and the plurality of the downlink antenna elements. The method may further include determining a maximum interference of the antenna array based on the determined power of the interference. The method may further include, in response to the maximum interference being less than or equal to a predefined target maximum interference, operating the antenna array based on the transformed beamforming coefficients vector.

In accordance with certain example embodiments, an apparatus may include means for determining an interference channel matrix of an antenna array having a plurality of uplink antenna elements and a plurality of downlink antenna elements. The apparatus may further include means for determining an untransformed beamforming coefficients vector. The apparatus may further include means for determining a transformed beamforming coefficients vector using the untransformed beamforming coefficients vector and the interference channel matrix. The apparatus may further include means for determining an interference of the plurality of the uplink antenna elements and the plurality of the downlink antenna elements using the transformed beamforming coefficients vector and determining a power of the interference of the plurality of the uplink antenna elements and the plurality of the downlink antenna elements. The apparatus may further include means for determining a maximum interference of the antenna array based on the determined power of the interference. The apparatus may further include means for, in response to the maximum interference being less than or equal to a predefined target maximum interference, operating the antenna array based on the transformed beamforming coefficients vector.

In accordance with various example embodiments, a non-transitory computer readable medium may include program instructions that, when executed by an apparatus, cause the apparatus to perform at least a method. The method may include determining an interference channel matrix of an antenna array having a plurality of uplink antenna elements and a plurality of downlink antenna elements. The method may further include determining an untransformed beamforming coefficients vector. The method may further include determining a transformed beamforming coefficients vector using the untransformed beamforming coefficients vector and the interference channel matrix. The method may further include determining an interference of the plurality of the uplink antenna elements and the plurality of the downlink antenna elements using the transformed beamforming coefficients vector and determining a power of the interference of the plurality of the uplink antenna elements and the plurality of the downlink antenna elements. The method may further include determining a maximum interference of the antenna array based on the determined power of the interference. The method may further include, in response to the maximum interference being less than or equal to a predefined target maximum interference, operating the antenna array based on the transformed beamforming coefficients vector.

In accordance with some example embodiments, a computer program product may perform a method. The method may include determining an interference channel matrix of an antenna array having a plurality of uplink antenna elements and a plurality of downlink antenna elements. The method may further include determining an untransformed beamforming coefficients vector. The method may further include determining a transformed beamforming coefficients vector using the untransformed beamforming coefficients vector and the interference channel matrix. The method may further include determining an interference of the plurality of the uplink antenna elements and the plurality of the downlink antenna elements using the transformed beamforming coefficients vector and determining a power of the interference of the plurality of the uplink antenna elements and the plurality of the downlink antenna elements. The method may further include determining a maximum interference of the antenna array based on the determined power of the interference. The method may further include, in response to the maximum interference being less than or equal to a predefined target maximum interference, operating the antenna array based on the transformed beamforming coefficients vector.

In accordance with certain example embodiments, an apparatus may include at least one processor and at least one memory storing instructions that, when executed by the at least one processor, cause the apparatus at least to determine an interference channel matrix of an antenna array having a plurality of uplink antenna elements and a plurality of downlink antenna elements. The at least one memory and instructions, when executed by the at least one processor, may further cause the apparatus at least to determine an untransformed beamforming coefficients vector. The at least one memory and instructions, when executed by the at least one processor, may further cause the apparatus at least to determine a transformed beamforming coefficients vector using the untransformed beamforming coefficients vector and the interference channel matrix. The at least one memory and instructions, when executed by the at least one processor, may further cause the apparatus at least to determine an interference of the plurality of the uplink antenna elements and the plurality of the downlink antenna elements using the transformed beamforming coefficients vector and determining a power of the interference of the plurality of the uplink antenna elements and the plurality of the downlink antenna elements. The at least one memory and instructions, when executed by the at least one processor, may further cause the apparatus at least to determine a maximum interference of the antenna array based on the determined power of the interference. The at least one memory and instructions, when executed by the at least one processor, may further cause the apparatus at least to, in response to the maximum interference being less than or equal to a predefined target maximum interference, operate the antenna array based on the transformed beamforming coefficients vector.

In accordance with various example embodiments, an apparatus may include first determining circuitry configured to perform determining an interference channel matrix of an antenna array having a plurality of uplink antenna elements and a plurality of downlink antenna elements. The apparatus may further include second determining circuitry configured to perform determining an untransformed beamforming coefficients vector. The apparatus may further include third determining circuitry configured to perform determining a transformed beamforming coefficients vector using the untransformed beamforming coefficients vector and the interference channel matrix. The apparatus may further include fourth determining circuitry configured to perform determining an interference of the plurality of the uplink antenna elements and the plurality of the downlink antenna elements using the transformed beamforming coefficients vector and determining a power of the interference of the plurality of the uplink antenna elements and the plurality of the downlink antenna elements. The apparatus may further include fifth determining circuitry configured to perform determining a maximum interference of the antenna array based on the determined power of the interference. The apparatus may further include operating circuitry configured to perform, in response to the maximum interference being less than or equal to a predefined target maximum interference, operating the antenna array based on the transformed beamforming coefficients vector.

BRIEF DESCRIPTION OF THE DRAWINGS

For a proper understanding of example embodiments, reference should be made to the accompanying drawings, wherein.

DETAILED DESCRIPTION

Figure 1:
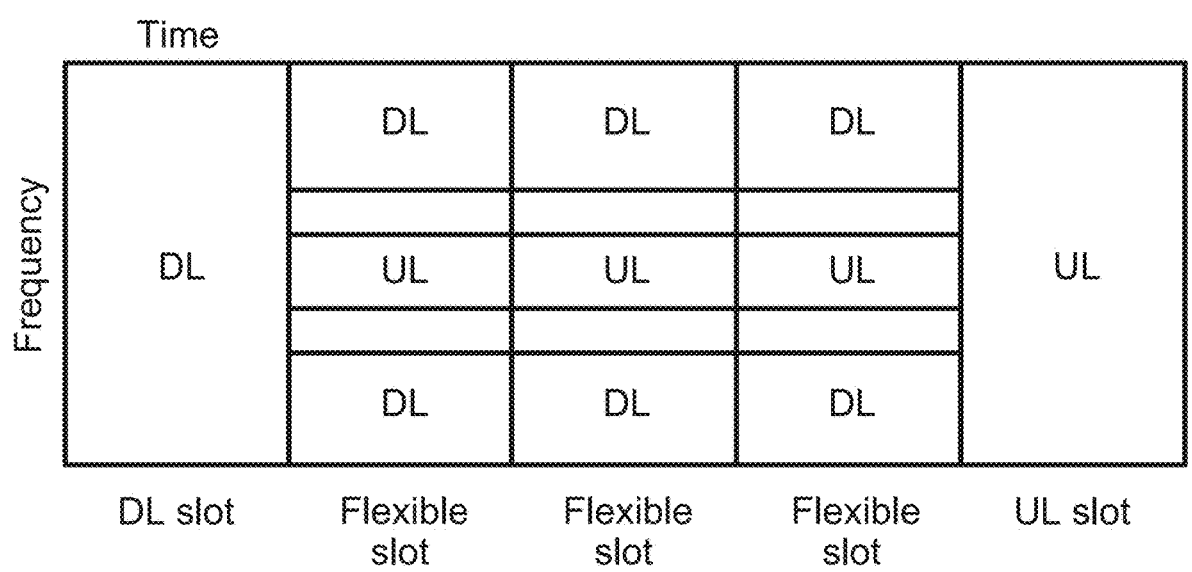
FIG. 1 illustrates an example of a subband full duplex time-frequency configuration.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for interference reduction is not intended to limit the scope of certain example embodiments, but is instead representative of selected example embodiments.

3GPP continues to develop subband non-overlapping full duplex (SBFD), recognizing that several types of interference are present for SBFD deployment for different uplink (UL)/downlink (DL) subband configuration (e.g., gNB interference). As just some examples, relevant types of interference include, but are not limited to, self-interference at base station, self-interference at user equipment, base station to base station cross-link interference, sector to sector cross-link interference, user equipment to user equipment inter-cell cross-link interference, user equipment to user equipment intra-cell cross-link interference, user equipment to base station inter-cell cross-link interference, and base station to user intercell cross-link interference.

NR/5G includes two types of duplex schemes: time division duplex (TDD) and frequency division duplex (FDD). TDD may use the same frequency channel for DL and UL transmissions, and DL and UL may be separated in time. Similarly, FDD may use two frequency channels: one frequency channel for DL, and another frequency channel for UL transmission. DL and UL may also overlap in time. FDD may also be half-duplex FDD by using two frequency channels, but without DL and UL overlapping in time, thereby avoiding the use of an expensive duplexing filter.

SBFD is a more recent duplexing scheme and is based upon TDD. Specifically, in TDD, time slot (or partial slot) transmissions may be allowed only in DL or UL direction. In contrast, in SBFD, time slot transmissions may be allowed in both directions. Similar to TDD, SBFD uses a single frequency channel. UL and DL transmissions may occur on two or more temporary allocated frequency subchannels.

Although SBFD provides several advantages, it also introduces the challenge of interference. In order to make UL reception possible, the base station receiver should be protected (i.e., isolated) from its own transmissions in DL (e.g., by more than 80 dB). In FDD, UL and DL transmissions may occur on different frequency channels, while the receiver may be protected from own transmissions by a duplexing filter. In SBFD, UL and DL transmissions may occur on the same frequency channel, but on different frequency subchannels. The subchannels may be temporarily allocated based upon demand and, in contrast to FDD, protecting one subchannel from interference by another subchannel with a duplexing filter is impractical. A further complication with implementation of SBFD is that, in FDD, UL and DL frequency channels are separated by dozens of MHz, while in SBFD, this gap may be a few resource blocks (RBs) (i.e., hundreds of kHz). Since a duplexing filter in SBFD is impractical, isolation may be possible with different means.

Certain example embodiments described herein may have various benefits and/or advantages to overcome the disadvantages described herein. For example, certain example embodiments may provide interference reduction that is relatively simple and easy to implement, and may be combined with other methods of interference mitigation. Thus, certain example embodiments discussed below are directed to improvements in computer-related technology.

In certain example embodiments, an antenna array may have two or more configurations in flexible slots. Configurations may differ based on which antenna elements of the base station are assigned for UL (e.g., for reception (RX) by the base station) and which are assigned for DL (e.g., for transmission (TX) by the base station). The base station may select the corresponding configuration, which may reduce interference. Interference may be calculated using a precoder vector (hereinafter, "beamforming coefficients vector") and an interference channel matrix. Since interference may depend on the beamforming coefficients vector, the selection may be performed each time the beamforming coefficients vector changes.

Figure 13:
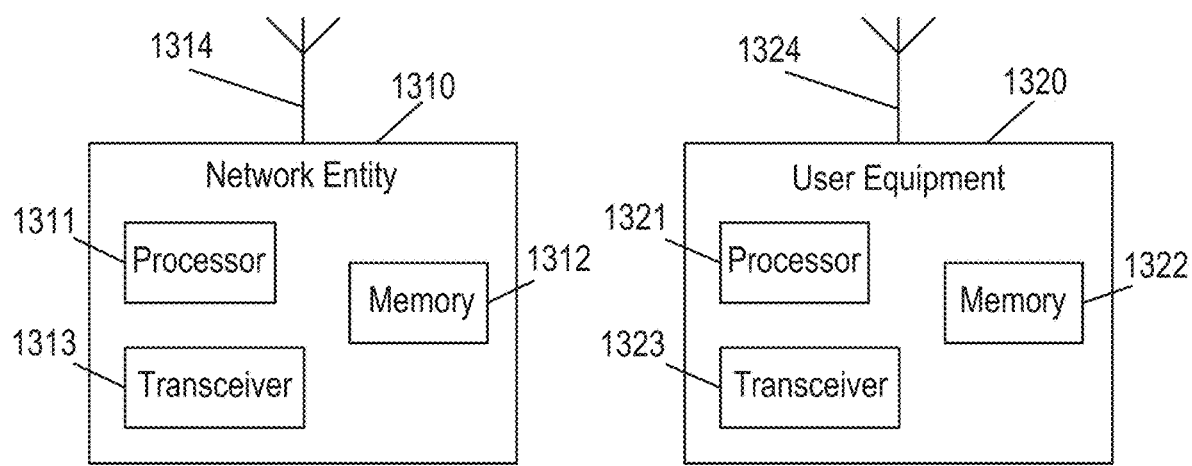
FIG. 13 illustrates an example of various network devices according to certain example embodiments.

In order to obtain channel state information (CSI) for an antenna configuration using a CSI-report-request mechanism in flexible slots, the base station may report to a user equipment, such as user equipment (UE) 1320 illustrated in FIG. 13, which antenna configuration is selected for each time interval (e.g., X), and the base station may then request a CSI report for that selected antenna configuration. The UE may calculate and transmit to the base station a CSI-report that is based upon the time interval for which the antenna configuration coincides with the requested CSI.

In order to obtain CSI information for the antenna configuration using sounding reference signals (SRS) in flexible slots, the base station may report to the UE which antenna configuration is selected for each time interval (flexible slot), and request SRS for that selected antenna configuration. The UE may then send SRS on the time interval with the requested antenna configuration.

FIG. 1 illustrates an example of a time-frequency configuration of SBFD. Although FIG. 1 illustrates a slot as a unit of time, it may be associated with the slot, symbol, etc. In DL and UL, slot transmission may occur in one direction. In X, slot transmissions may occur in DL and UL. FIG. 1 illustrates an example configuration of flexible slots in frequency domain, where UL subband is allocated between two DL subbands.

Figure 2:
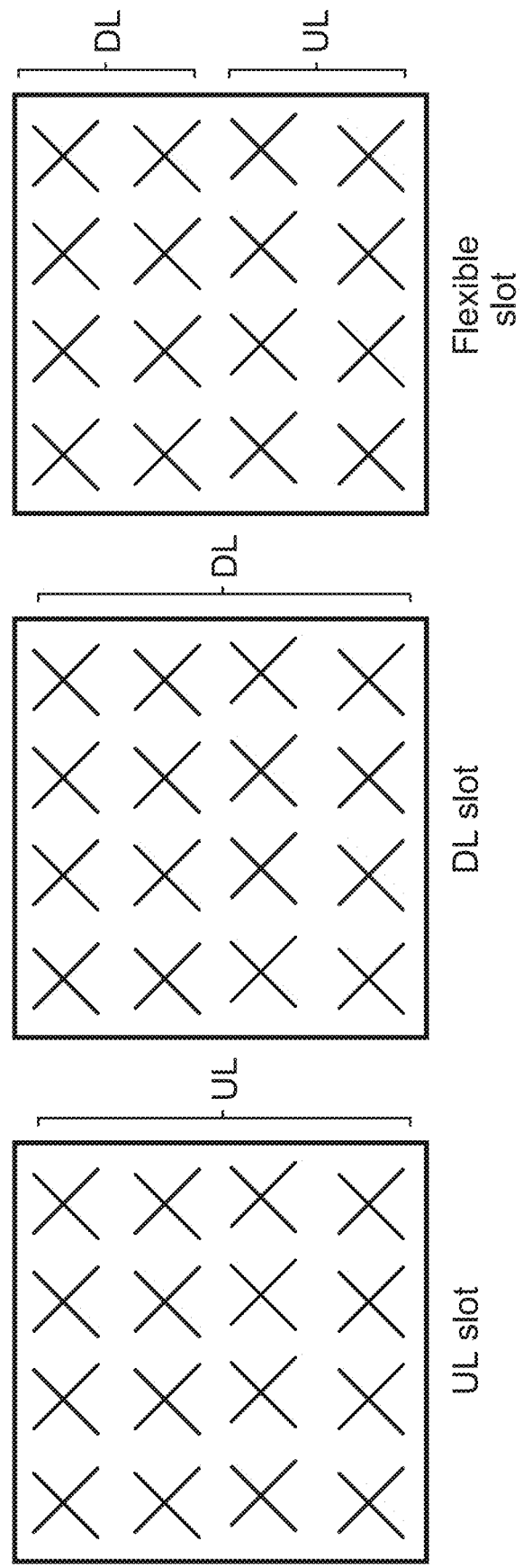
FIG. 2 illustrates an example of an antenna array configuration in UL slots, DL slots, and flexible slots according to certain example embodiments.

FIG. 2 illustrates an example of a dual polarized rectangular antenna array. In UL slots, the entire array may be configured for reception, in DL slots, for transmission. In flexible slots, antenna elements may be split into two subsets: one for DL, and one for UL.

Figure 3:
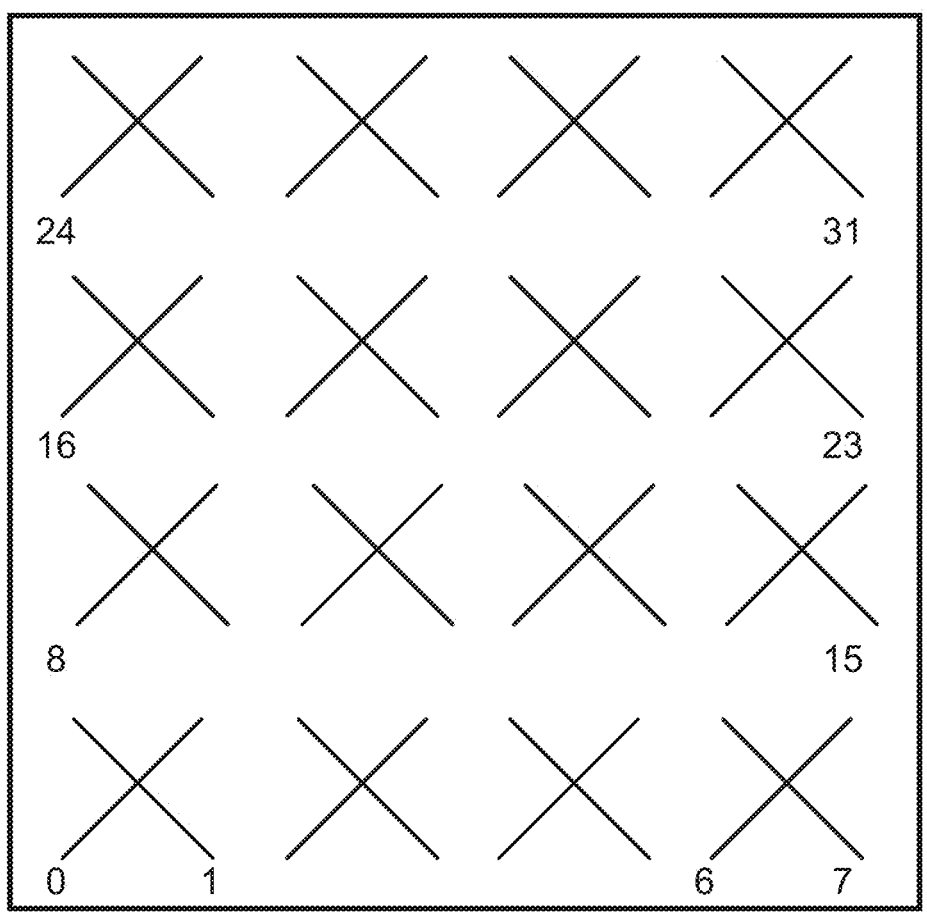
FIG. 3 illustrates an example enumeration of antenna elements according to some example embodiments.
Figure 4:
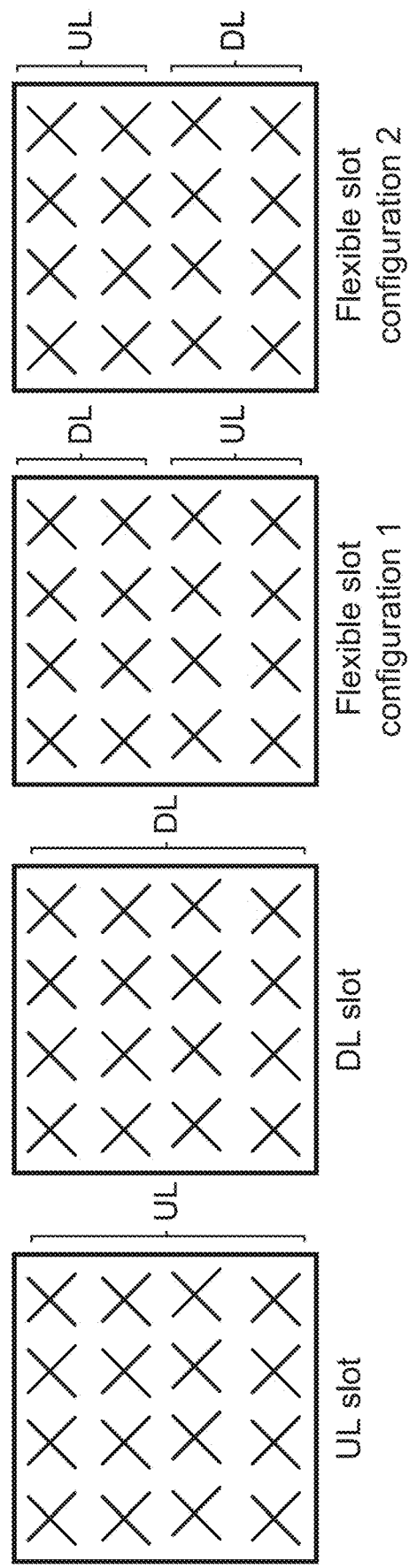
FIG. 4 illustrates an example of an antenna array in UL slots, DL slots, and two configurations in flexible slots according to various example embodiments.

Described herein are various embodiments for configuring flexible slots. FIG. 3 illustrates an example of an enumeration of antenna elements. If antenna elements are arranged as illustrated in FIG. 4, then in the first configuration, antenna elements 0-15 may be configured for UL, and antenna elements 16-32 may be configured for DL. In the second configuration, antenna elements 0-15 may be configured for DL, and antenna elements 16-32 may be configured for UL.

The base station may select one of the first or second configurations in order to minimize interference. Assuming one tap channel and unity DL signals, the interference from one or more DL antenna elements to the $n^{th}$ UL antenna element may be defined as $s_n^{UL}(w^{DL}) = \sum_{m=0}^{M-1} h(m, n) \cdot w_m^{DL}$, where $h(m, n)$ may be a coefficient of the channel between an $m^{th}$ DL element and $n^{th}$ UL element. This channel may be a direct link between antenna elements and/or reflections from the clutter. $w_m^{DL}$ may be an $m^{th}$ coefficient of the DL beamforming coefficients vector.

In various example embodiments, selecting between the first or second configuration may include considerations such as, but not limited to, minimizing the maximum interference power over one or more UL antenna elements according to Equation (1), such that $$S = \max_n |s_n^{UL}(w^{DL})|^2, \quad (1)$$

minimizing the mean interference power over one or more UL antenna elements according to Equation (2), such that $$S = \operatorname*{mean}_n |s_n^{UL}(w^{DL})|^2, \quad (2)$$

and/or minimizing the interference power based on UL beamforming according to Equation (3), such that $$S = \sum_{n=0}^{N-1} s_n^{UL}(W^{DL}) \cdot w_n^{UL}, \quad (3)$$

where $w_n^{UL}$ may be the $n^{th}$ coefficient of the UL beamforming coefficients vector, and N may be the number of UL antenna elements. Accordingly, in some examples, minimizing maximum interference power may be based on a maximum interference power from one or more downlink antenna elements to a given uplink antenna element of the plurality of uplink antenna elements, minimizing mean interference power from one or more downlink antenna elements to a given uplink antenna element of the plurality of uplink antenna elements may include determining a mean interference power, and/or minimizing interference power may include applying uplink beamforming vector.

In an example, minimizing the maximum interference power over one or more UL antenna elements as described herein may reduce the dynamic range of the signal at individual antenna elements. The interference may be very large compared to a weak UL signal. Reducing interference before it reaches an analog RX chain may be beneficial. In another example, minimizing the mean interference power over one or more UL antenna elements and/or minimizing the interference power based on UL beamforming may reduce the average per-element interference or the interference after RX combining.

Figure 5:
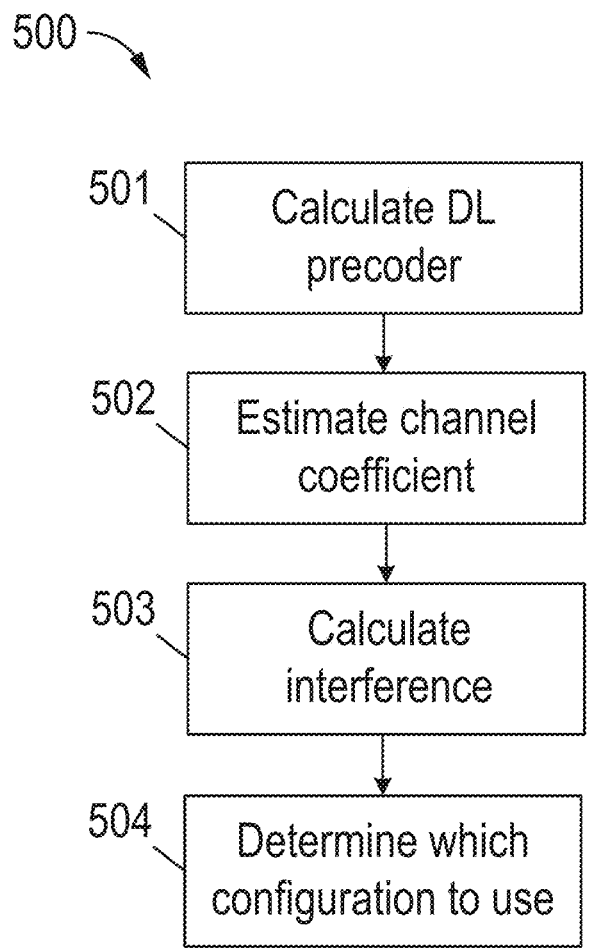
FIG. 5 illustrates an example of a flow diagram of a method according to various example embodiments.

FIG. 5 illustrates an example of a flow diagram of a method 500 that may be performed by a base station, such as network entity 1310 illustrated in FIG. 13, according to various example embodiments. The interference for configuration k may be denoted by S(k).

At 501, the method 500 may include calculating beamforming coefficients vector w and/or selecting the beamforming coefficients vector from the codebook or receiving the index of the beamforming coefficients vector in CSI report from the UE.

At 502, the method 500 may include estimating channel coefficients h (m, n).

At 503, the method 500 may include calculating interference according to Equation (1), Equation (2), and/or Equation (3) for the first or second configuration.

Figure 6:
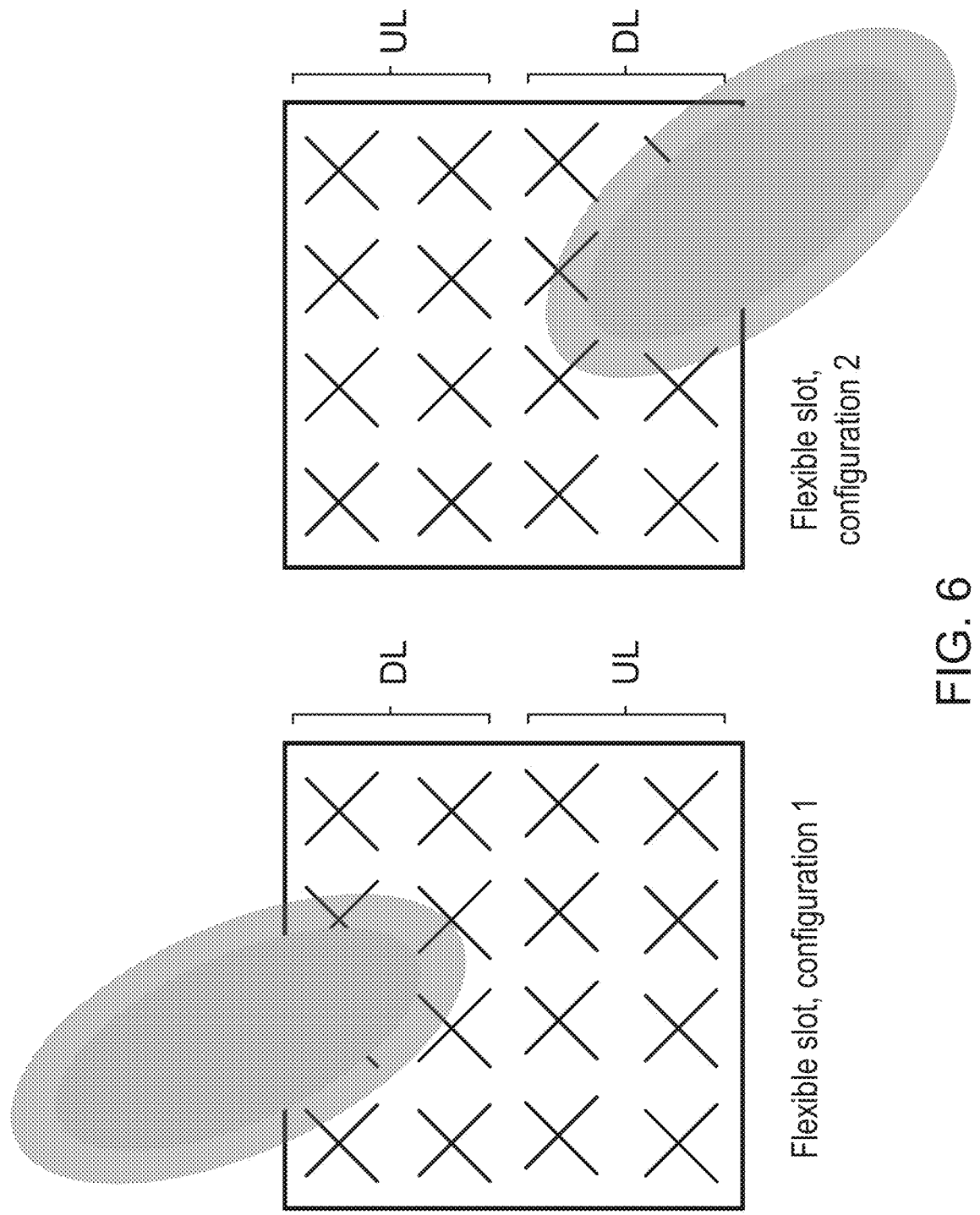
FIG. 6 illustrates an example of an antenna array configuration in UL slots, DL slots, and flexible slots with two configurations according to certain example embodiments.

FIG. 6 depicts an example of an antenna array configuration in UL, DL, and flexible slots with two configurations. At 504, if S(1)<S(2), the method may include using the first configuration illustrated and described in reference to flexible slot, configuration 1 illustrated in FIG. 4, which depicts an antenna array configuration in UL, DL, and flexible slots with two configurations. Alternatively, if S(1)≥S(2), the method may include using the second configuration, as illustrated, for example, in flexible slot, configuration 2 illustrated in FIG. 4.

Figure 7:
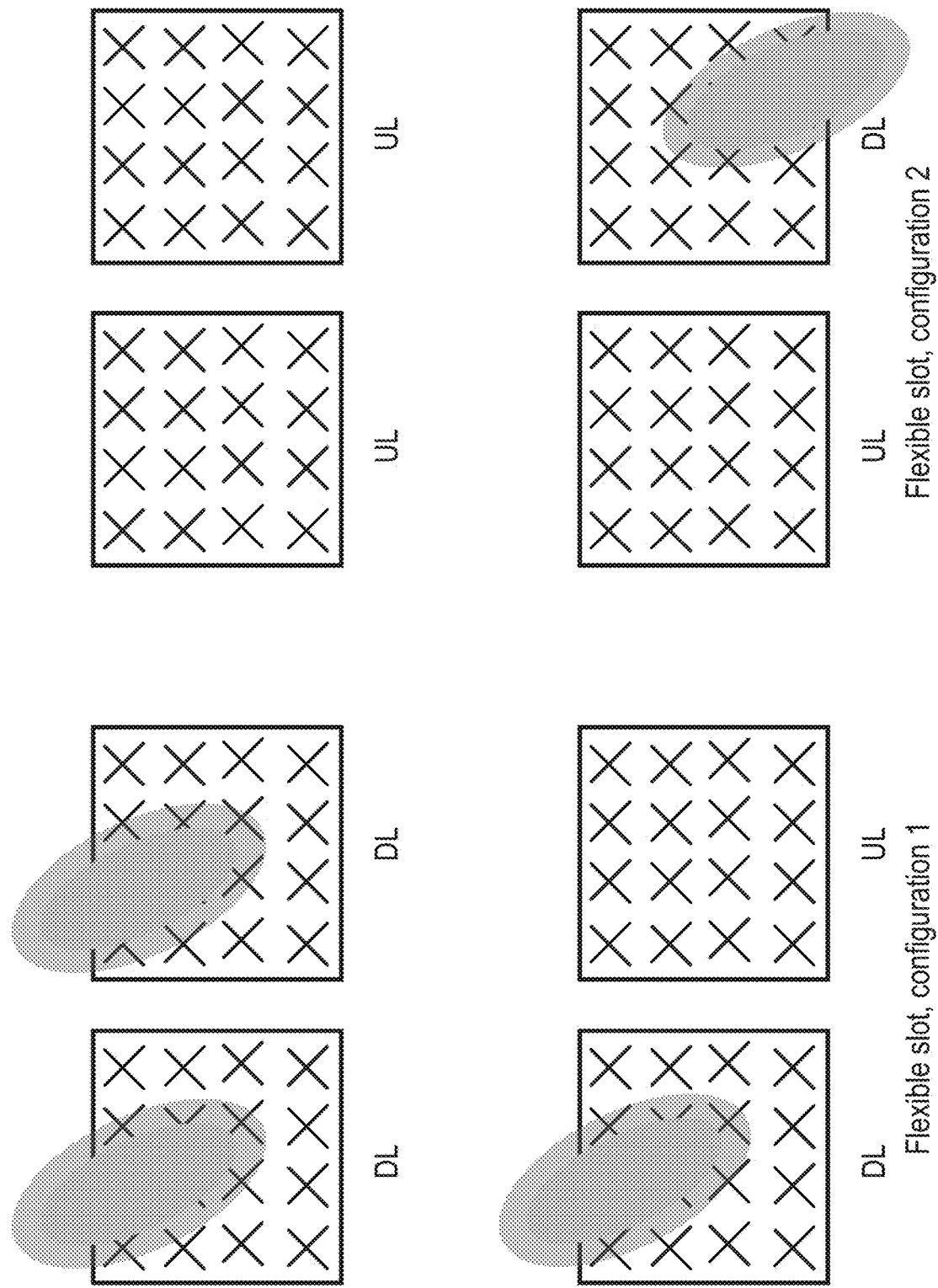
FIG. 7 illustrates an example implementation with two antenna panels according to some example embodiments.

FIG. 7 depicts various example embodiments using two separate antenna panels to increase the DL-UL isolation. In this embodiment, assuming that each panel is RX- and TX-capable, in the first configuration, the first panel may be configured for DL, and the second panel may be configured for UL. In the second configuration, UL and DL may be reversed.

Figure 8:
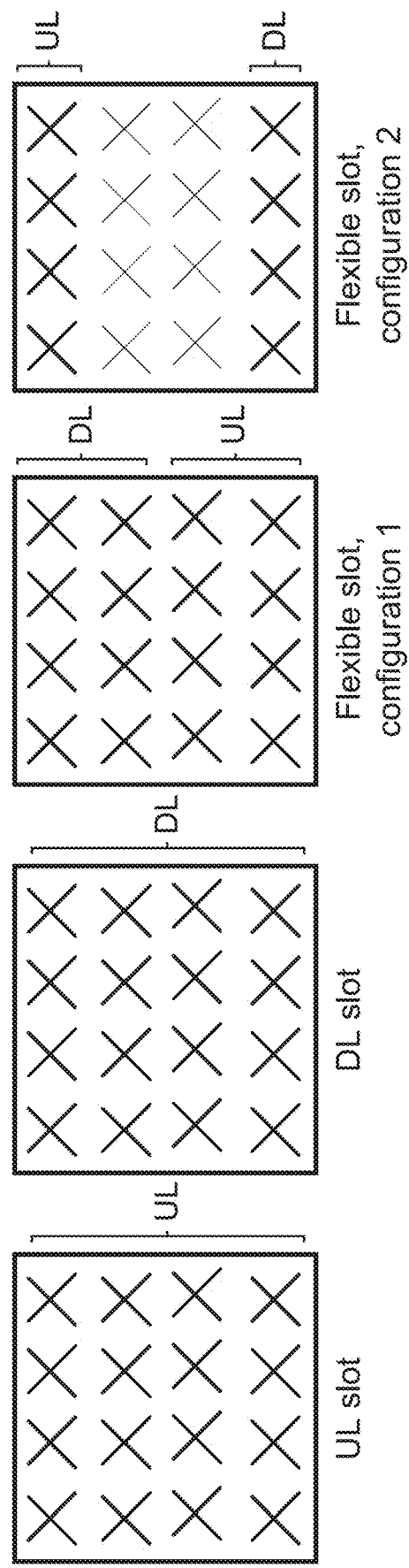
FIG. 8 illustrates an example of variable sizes of subsets according to various example embodiments.

FIG. 8 depicts certain example embodiments where the network entity uses one of the first and second configurations with a different number of antenna elements in the UL and DL subsets. If S(1)<threshold, the network entity may use the first configuration; otherwise, the network entity may use the second configuration.

As described herein, the method of FIG. 5 may select an antenna configuration from among the first and second configurations. In example embodiments, TX power, applied to antenna elements of the same polarization in DL subset, may be defined according to Equation (4), such that $$P_k = \sum_{n=0}^{(N-1)/2} p_{n+k}, k = 1,2, \quad (4)$$

where $p_i$ may be the power of the $i^{th}$ antenna element (e.g., FIG. 4).

After selecting antenna configuration from among the first and second configurations, the method may further include, if S(m)>threshold_2, reducing S(m) by optimizing $P_1$ and $P_2$, where m is the configuration index, selected at 504.

CSI may be obtained in a variety of ways in NR/5G, including channel sounding and CSI reporting. For example, for CSI reporting, the base station may request the UE to perform measurements and provide a report. Two antenna configurations may be used in flexible slots, wherein CSI information may be obtained for both configurations. For example, in certain example embodiments, the base station may report to the UE what antenna configuration is selected for each time interval (e.g., flexible slot), and request a CSI report for one antenna configuration. The UE may then calculate and send to the base station a CSI-report, based on the time interval for which the antenna configuration coincides with requested CSI report.

In various example embodiments, the base station may report to the UE which antenna configuration is selected for each time interval (e.g., flexible slot), and request SRS for one antenna configuration. The UE may then transmit SRS on the time interval with requested antenna configuration. It is noted that obtaining CSI information using SRSs in flexible slots may be less likely to be used because may require periodic frequency resource switching in those slots.

Figure 9:
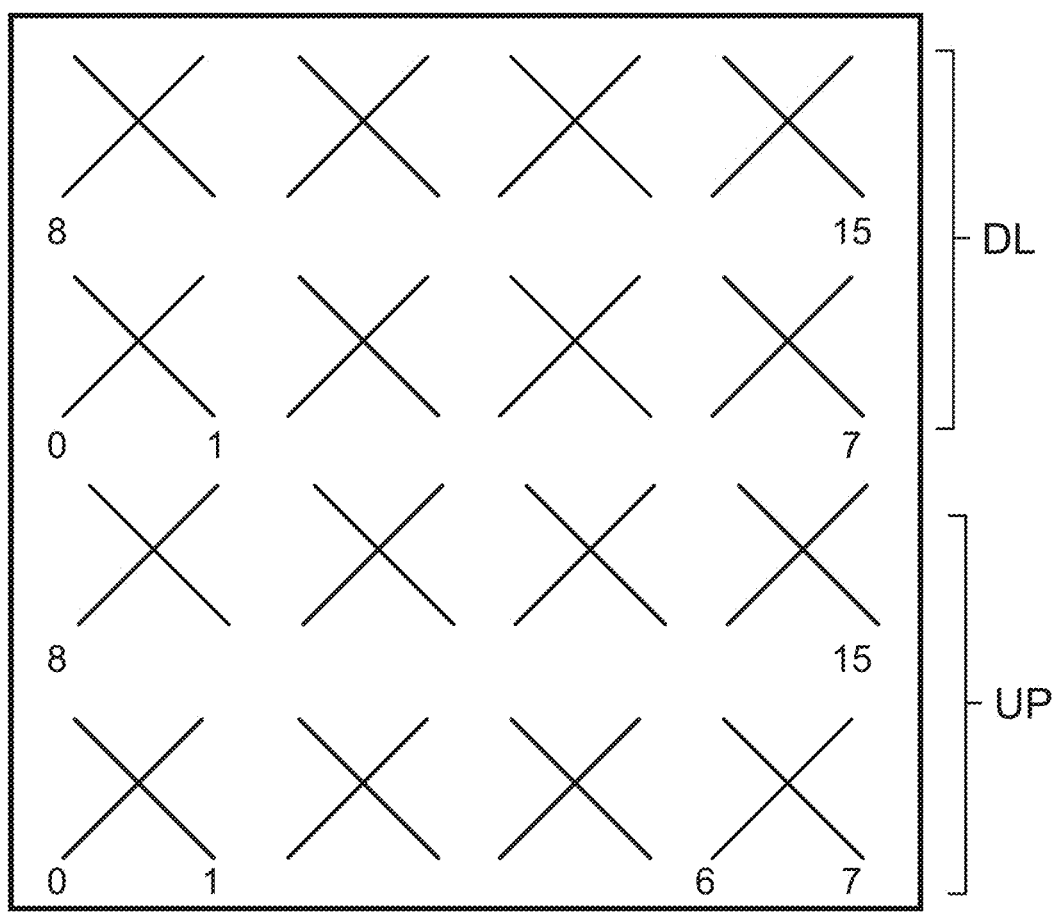
FIG. 9 illustrates another example enumeration of antenna elements according to some example embodiments.

As shown in FIG. 9, certain example embodiments may include an enumeration of antenna elements in flexible slots, when this enumeration in DL and UL subsets is independent.

Figure 10:
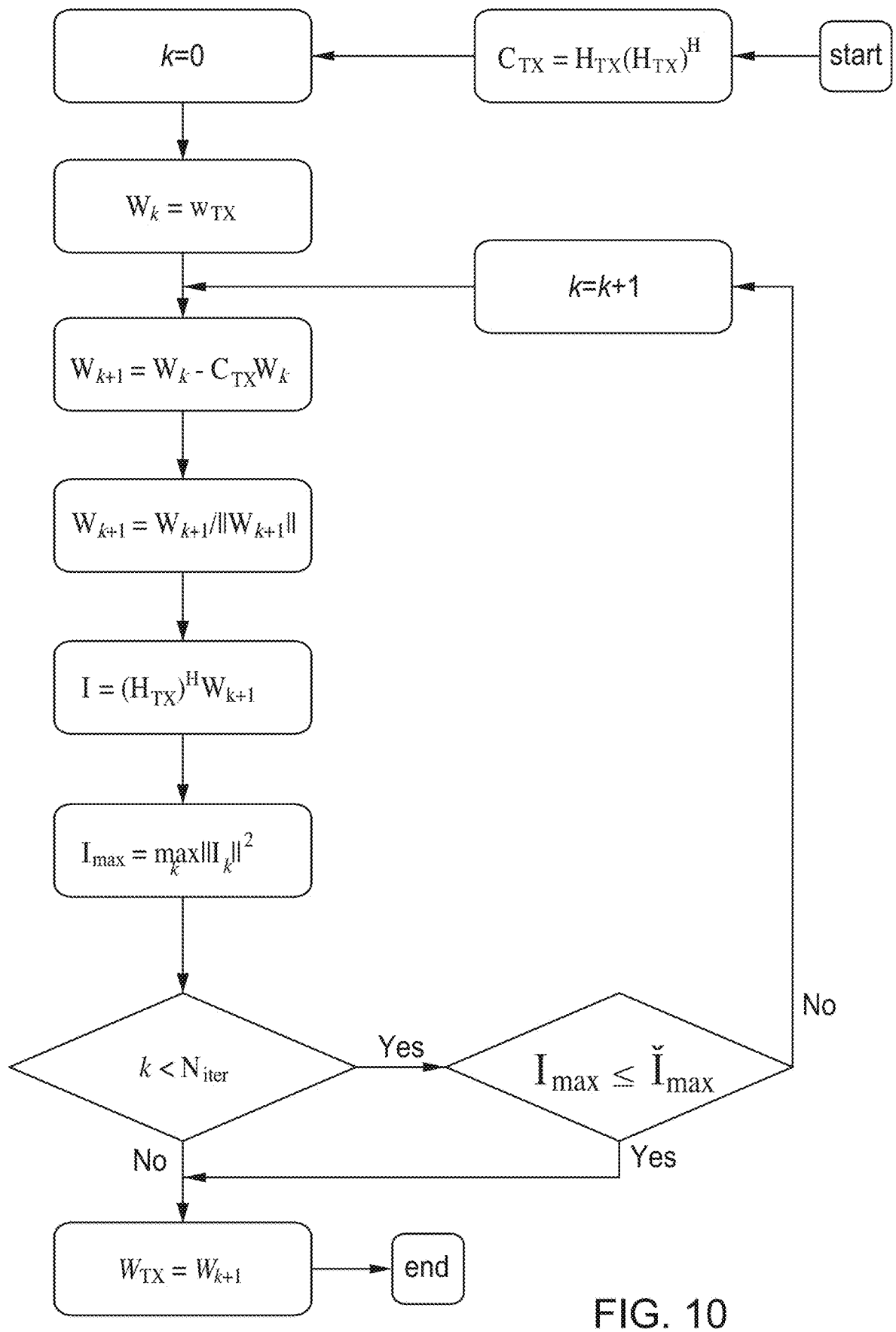
FIG. 10 illustrates an example block diagram according to some example embodiments.

FIG. 10 illustrates an example flow chart of some example embodiments. For example, the channel between $l^{th}$ TX and $m^{th}$ RX antenna elements at a predefined TX frequency may be denoted by $h_{l,m}^{TX}$. One or more operations of FIG. 10 may be executed by a network entity configured to perform these operations, such as network entity 1310 illustrated in FIG. 13, which may include processor 1311 and memory 1312.

Processor 1311 may be configured to determine a channel matrix $H_{TX}$ of the antenna array. In one example, processor 1311 may be configured to determine the channel matrix $H_{TX} \in \mathbb{C}^{N_{TX} \times N_{RX}}$ according to Equation (5), such that $$H_{TX} = \begin{bmatrix} h_{1,1}^{TX} & \cdots & h_{1,N_{RX}}^{TX} \\ \cdots & \ddots & \cdots \\ h_{N_{TX},1}^{TX} & \cdots & h_{N_{TX},N_{RX}}^{TX} \end{bmatrix}, \quad (5)$$

where $N_{TX}$ may be the number of TX antenna elements, and $N_{RX}$ may be the number of RX antenna elements.

Processor 1311 may be configured to determine a covariance $C_{TX}$ of the channel matrix $H_{TX}$. In one example, processor 1311 may be configured to determine the covariance $C_{TX}$ of the channel matrix $H_{TX}$ (also denoted $C_{TX} \in \mathbb{C}^{N_{TX} \times N_{TX}}$) according to Equation (6), such that $$C_{TX} = H_{TX}(H_{TX})^H, \quad (6)$$

where $W_{TX} \in \mathbb{C}^{N_{TX} N_{RX} \times 1}$ is indicative of TX beamforming coefficients vector. As just some examples, processor 1311 may be configured to determine the beamforming coefficients vector by selecting the beamforming coefficients vector from the codebook (which may be stored in memory, such as memory 1312 shown in FIG. 13), by calculating, or otherwise determining, the beamforming coefficients vector using eigenvector decomposition, or obtained by any other method.

$W_{TX} \in \mathbb{C}^{N_{TX} N_{RX} \times 1}$ is indicative of TX beamforming coefficients vector, obtained by transformation of $W_{TX}$. The goal of this transformation is to reduce interference. $W_{TX}$ may be obtained by recursive calculations according to Equation (7), such that $$W_{k+1} = f(W_k, H_{TX}), \quad (7)$$

where k=0 ... $N_{iter}-1$ and $N_{iter}$ is the maximum number of iterations. Processor 1311 may initiate calculations by setting an initial value of the transformed vector Wo to the untransformed vector $W_{TX}$:

$$W_0 = w_{TX} \quad (8)$$

Processor 1311 may determine a transformation function $f(W_k, H_{TX})$ according to Equation (9), such that $$f(W_k, H_{TX}) = \frac{w_k - c_{TX} w_k}{\|w_k\|}, \quad (9)$$

where $\|W_k\|$ is indicative of a Euclidean norm. Processor 1311 may continue performing iterative calculations until a predefined target maximum number of iterations $N_{iter}$ is reached, or until other stopping criteria is satisfied. An example stopping criteria includes a maximum interference at the RX antenna elements. Processor 1311 may assume unity and may determine signal interference $I \in \mathbb{C}^{N_{RX} \times 1}$ using Equation (10), such that $$I = (H_{TX})^H w_{TX}. \quad (10)$$

Processor 1311 may determine the maximum interference using Equation (11), such that $$I_{max} = \max_k \|I_k\|^2, \quad (11)$$

where $I_k$ may be $k^{th}$ element of the vector I and may be indicative of interference at $k^{th}$ antenna element. Stopping criteria may be determined using Equation (12), such that $$I_{max} \le \check{I}_{max}, \quad (12)$$

where $\check{I}_{max}$ is the target value of the maximum interference. The iterations stop when this target value is reached. The target value of the maximum interference $\check{I}_{max}$ is selected low enough to avoid blocking or saturation of the RX RF circuits.

Each iteration may increase suppression of interference and/or cause the transformed beamforming vector to deviate from the original beamforming vector. Accordingly, in some applications, an example stopping criteria may include a deviation level of $W_k$ from $W_{TX}$ being greater than a predefined threshold value. The deviation level may be measured directly, by a Euclidean distance or, for example, by dot product of two vectors, or indirectly, by, for example, a loss of the beamforming gain.

In response to determining that $E_k$ is a Euclidean distance between vector $w_{TX}$ and $W_k$, $$E_k = \|w_{TX} - W_k\|, \quad (13)$$

Processor 1311 may be configured to use a stopping criteria such that:

$$E_k > \check{E}_k, \quad (14)$$

where $\check{E}_k$ is the maximum acceptable value of a Euclidean distance. If this value is exceeded, then processor 1311 may be configured to stop performing iterative calculations, e.g., one or more operations of FIG. 10.

As still another example, processor 1311 may be configured to concatenate two or more stopping criteria using logical operations (e.g., disjunction, conjunction, etc.) to form a new stopping criteria, for example:

$$I_{max} \le \check{I}_{max} \| E_k > \check{E}_k, \quad (15)$$

where $\|$ is indicative of a disjunction.

$H_{TX}$ is a channel matrix for a specific frequency in the TX band, usually the center frequency of the band. If the band is wide, then the estimation error results in worse interference cancellation for frequencies significantly different from the center frequency. This can be overcome by introducing subbands and calculating a transformed beamforming coefficients vector for each of the subband. Denote by $f \in R^{N_{SB} \times 1}$ a vector of frequencies, where $N_{SB}$ is a number pf subbands. The element $f_k$ of this vector is a center frequency of the $k^{th}$ subband. $H_{TX}(k)$ is the channel matrix at frequency $f_k$. $W_{TX}(k)$ is a transformed beamforming coefficients vector, calculated for $H_{TX}(k)$ and the same untransformed vector $W_{TX}$. $W_{TX}(k)$ is calculated for one or more subbands. In this way, a more uniform suppression of interference is achieved over the entire frequency band.

Figure 11:
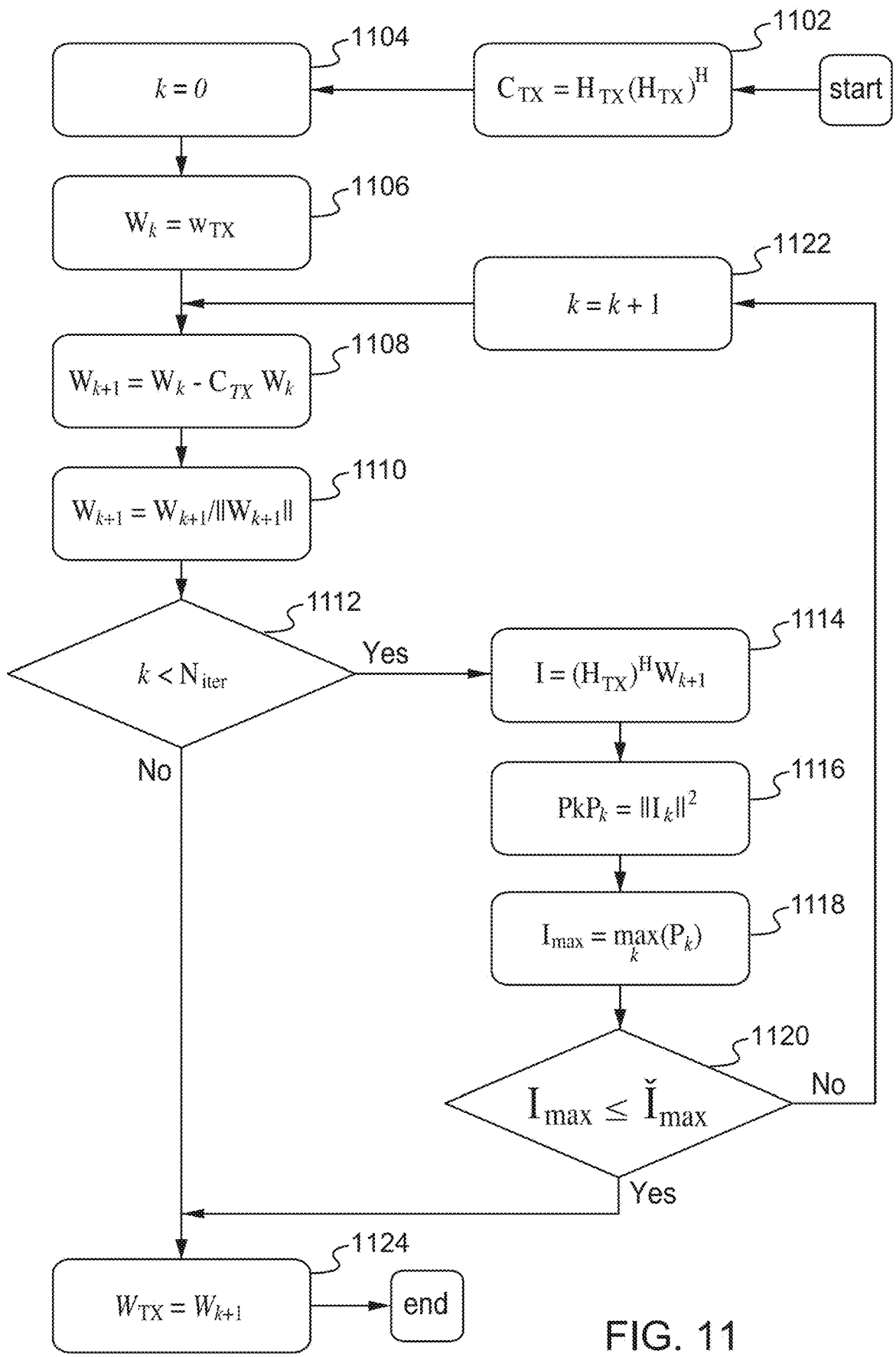
FIG. 11 illustrates another example block diagram according to some example embodiments.

FIG. 11 illustrates another an example flow chart of some example embodiments. For example, the channel between $l^{th}$ TX and $m^{th}$ RX antenna elements at a predefined TX frequency may be denoted by $h_{l,m}^{TX}$.

As described in reference to at least FIG. 11, processor 1311 may determine an interference channel matrix $H_{TX}(k)$ of an antenna array having a plurality of RX elements and a plurality of TX elements, wherein each element of the interference channel matrix is indicative of a physical channel between one of the plurality of uplink antenna elements and one of the plurality of downlink antenna elements. As just some examples, processor 1311 may be configured to determine the beamforming coefficients vector by selecting the beamforming coefficients vector from the codebook, by calculating, or otherwise determining, the beamforming coefficients vector using eigenvector decomposition, or obtaining the beamforming coefficients vector by another method or combination of methods.

Processor 1311, at block 1102, may determine a covariance of the interference channel matrix, such as, for example, using Equation (6) described in reference to FIG. 11.

Processor 1311, at block 1104, may set a number of iterations to zero. At block 1106, processor 1311 may set a transformed beamforming coefficients vector $W_k$ equal to an untransformed beamforming coefficients vector $w_{TX}$, where the untransformed beamforming coefficients vector $w_{TX}$ is determined using one or more of initial conditions, from codebook, or calculated in some traditional way, such as eigen vector.

During a first or a next iteration k, processor 1311 may determine, at block 1108, a new transformed transmitting beamforming coefficients vector $W_{k+1}$ by determining a difference between the transformed beamforming coefficients vector $W_k$ and a product of the covariance of the interference channel matrix $C_{TX}$ and the transformed beamforming coefficients vector $W_k$ (e.g., as provided in Equation (9) described in reference to at least FIG. 10). Processor 1311, at block 1110, may normalize the new transformed beamforming coefficients vector $W_{k+1}$ (e.g., as provided in Equation (9) described in reference to at least FIG. 10).

At block 1112, processor 1311 may determine whether a number of iterations k is less than a predefined maximum number of iterations $N_{iter}$. In response to determining that the number of iterations k is less than the predefined number, processor 1311 may determine, at block 1114, an interference I at each receiving element based on the new transformed beamforming coefficients vector $W_{k+1}$ and a corresponding element of the interference channel matrix $(H_{TX})^H$.

At block 1116, processor 1311 may determine a power $P_k$ of the interference at each receiving element based on interference I at each receiving element. In an example, processor 1311 may determine a power $P_k$ of the interference at each receiving element using Equation (16), such that $$P_k = \|I_k\|^2, \qquad (16)$$

Processor 1311 may select, at block 1118, a maximum value $I_{max}$ of the power $P_k$ of interference I. In one example, processor 1311 may be configured to select the maximum interference value based on equation (17), such that $$I_{max} = \max_k(P_k) \qquad (17)$$

Processor 1311 may determine, at block 1120, whether the maximum interference $I_{max}$ at the receiving antenna elements is less than or equal to a predefined target maximum interference $\check{I}_{max}$ (e.g., according to Equation (12) described in reference to at least FIG. 10). In response to the maximum interference at the receiving antenna elements being greater than the predefined target maximum interference, processor 1311 may increase, at block 1122, the number of the iteration k and returns to blocks 1108 and 1110 where the new transformed transmitting beamforming coefficients vector is determined.

In response to one of (i) the number of iterations being greater than the predefined number or (ii) the maximum interference at the receiving antenna elements being less than or equal to the predefined target maximum interference, processor 1311 may be configured to, at block 1124, set the transmitting beamforming coefficients vector $W_{TX}$ equal to the new transformed beamforming coefficients vector $W_{k+1}$. Processor 1311 may then exit the process described in reference to FIG. 11. In other examples, the process of FIG. 11 may be repeated in response to one or more operating conditions.

In one example, upon completion of the one or more operations of blocks 1102-1124, processor 1311 may be configured to cause the antenna array to operate according to the new transformed beamforming coefficients vector.

Figure 12:
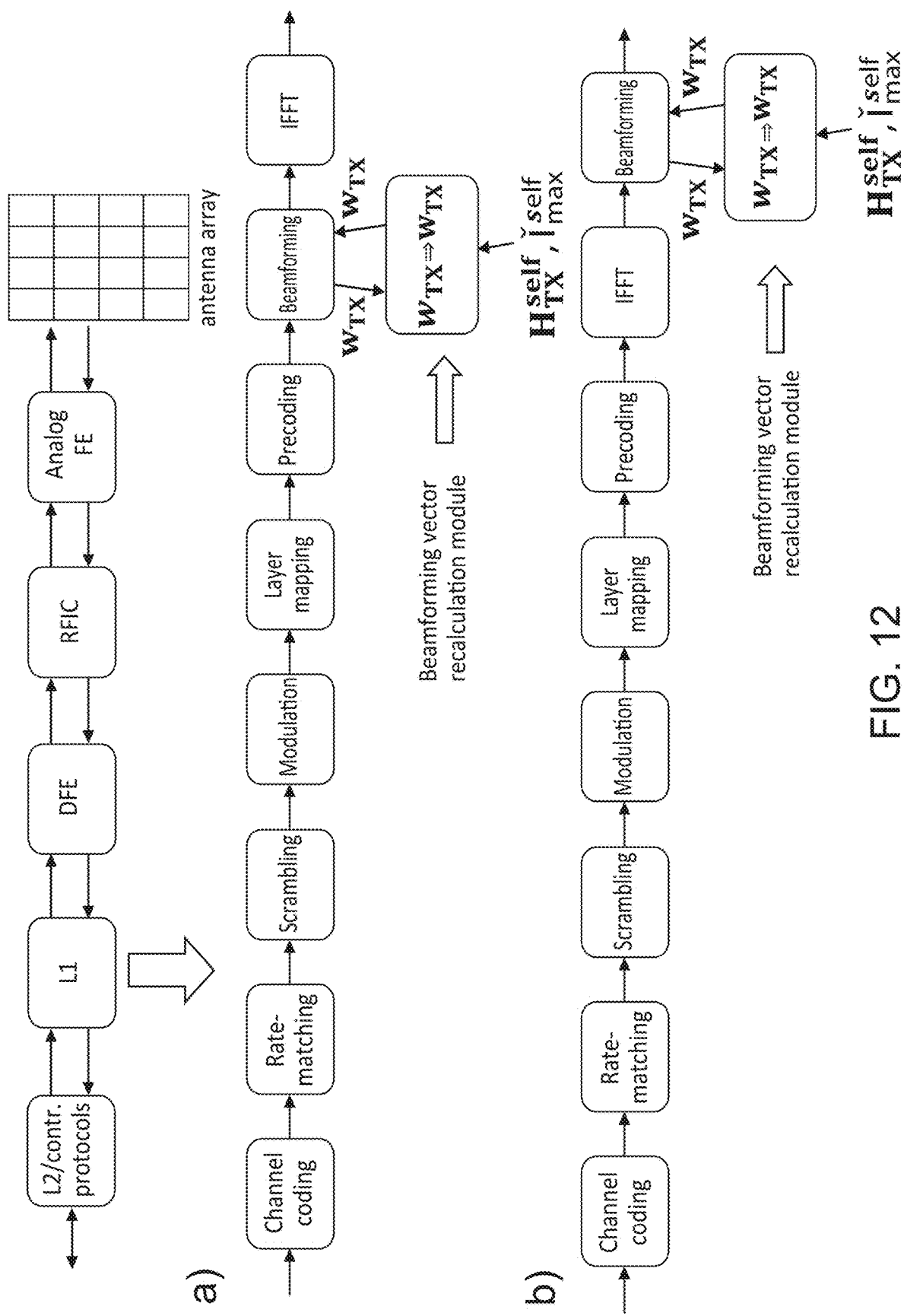
FIG. 12 illustrates an example of a hardware scheme according to various example embodiments.

FIG. 12 depicts an example of hardware that may be used in various example embodiments. In particular, FIG. 12 illustrates that the procedures described herein may be performed as part of a beamforming vector recalculation module during a beamforming operation, either before or after Inverse fast Fourier transform (IFFT). As illustrated in FIG. 12, a radio-frequency integrated circuit (RFIC) may be in communication with a digital front end (DFE) and an analog front end (FE). The DFE, RFIC, and analog FE may perform any of IFFT, digital up-conversion, crest factor reduction, digital predistortion, digital-to-analog conversion, power amplification, analog up-conversion, and/or digital and analog filtering. In addition, FIG. 12 illustrates an L1 block for processing NR/5G PDSCH channels. The blocks depicted in a) may perform beamforming in frequency domain, while the blocks depicted in b) may perform beamforming in time domain.

FIG. 13 illustrates an example of a system according to certain example embodiments. In one example embodiment, a system may include multiple devices, such as, for example, network entity 1310 and/or UE 1320.

Network entity 11310 may be one or more of a base station (e.g., 3G UMTS NodeB, 4G LTE Evolved NodeB, or 5G NR Next Generation NodeB), a serving gateway, a server, and/or any other access node or combination thereof.

Network entity 1310 may further comprise at least one gNB-centralized unit (CU), which may be associated with at least one gNB-distributed unit (DU). The at least one gNB-CU and the at least one gNB-DU may be in communication via at least one F1 interface, at least one $X_n$-C interface, and/or at least one NG interface via a $5^{th}$ generation core (5GC).

UE 1320 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Furthermore, network entity 1310 and/or UE 1320 may be one or more of a citizens broadband radio service device (CBSD).

Network entity 1310 and/or UE 1320 may include at least one processor, respectively indicated as 1311 and 1321. Processors 1311 and 1321 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1312 and 1322. The memory may be fixed or removable. The memory may include computer program instructions or computer code contained therein. Memories 1312 and 1322 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1311 and 1321, memories 1312 and 1322, and any subset thereof, may be configured to provide means corresponding to the various blocks of FIGS. 2-12. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 13, transceivers 1313 and 1323 may be provided, and one or more devices may also include at least one antenna, respectively illustrated as 1314 and 1324. The device may have many antennas, such as an array of antennas configured for multiple input multiple output (MIMO) communications, or multiple antennas for multiple RATs. Other configurations of these devices, for example, may be provided. Transceivers 1313 and 1323 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described herein (i.e., FIGS. 2-12). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 2-12. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 14:
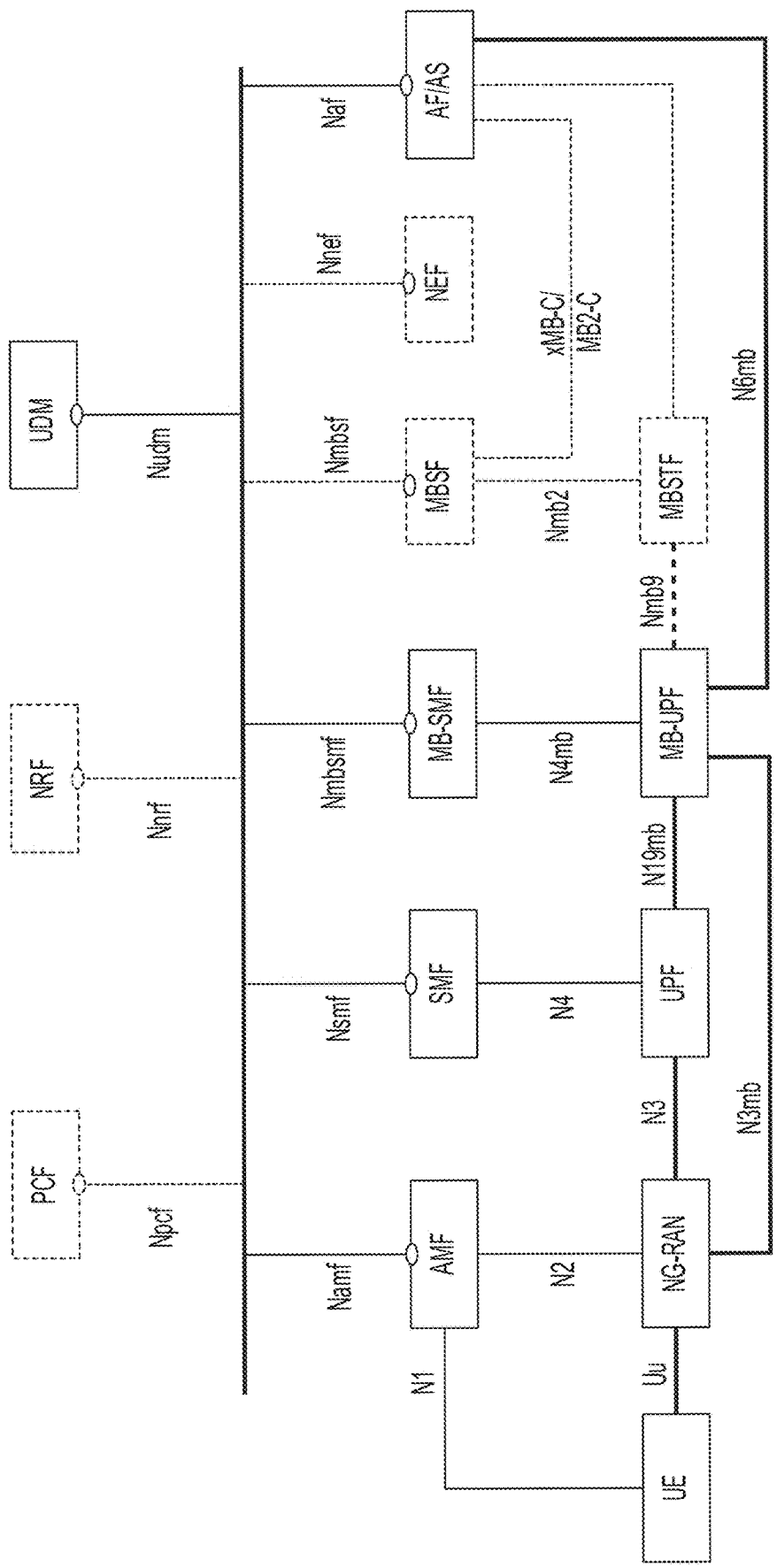
FIG. 14 illustrates an example of a 5G network and system architecture according to some example embodiments.

FIG. 14 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The network entity and UE illustrated in FIG. 14 may be similar to network entity 1310 and UE 1320, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

According to certain example embodiments, processors 1311 and 1321, and memories 1312 and 1322, may be included in or may form a part of processing circuitry or control circuitry. In addition, in some example embodiments, transceivers 1313 and 1323 may be included in or may form a part of transceiving circuitry.

In some example embodiments, an apparatus (e.g., network entity 1310 and/or UE 1320) may include means for performing a method, a process, or any of the variants discussed herein. Examples of the means may include one or more processors, memory, controllers, transmitters, receivers, and/or computer program code for causing the performance of the operations.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed in this disclosure may be performed in a different order and/or concurrently with each other. Furthermore, if desired, one or more of the described functions or procedures may be optional or may be combined. As such, the description of the present disclosure should be considered as illustrative of the principles and teachings of certain example embodiments, and not in limitation thereof.

One having ordinary skill in the art will readily understand that the example embodiments discussed in the present disclosure may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

The invention claimed is:

1. A method comprising:
 determining an interference channel matrix of an antenna array having a plurality of uplink antenna elements and a plurality of downlink antenna elements;
 determining an untransformed beamforming coefficients vector;
 determining a transformed beamforming coefficients vector using the untransformed beamforming coefficients vector and the interference channel matrix;
 determining an interference of the plurality of the uplink antenna elements and the plurality of the downlink antenna elements using the transformed beamforming coefficients vector and determining a power of the interference of the plurality of the uplink antenna elements and the plurality of the downlink antenna elements;
 determining a maximum interference of the antenna array based on the determined power of the interference;
 in response to the maximum interference being less than or equal to a predefined target maximum interference, operating the antenna array based on the transformed beamforming coefficients vector, and
 in response to the maximum interference being greater than a predefined target maximum interference, determining a new transformed beamforming coefficients vector using the transformed beamforming coefficients vector and the interference channel matrix.

2. The method of claim 1, wherein the transformed beamforming coefficients vector is calculated by minimizing at least one of the following:
 maximum interference power over one or more uplink antenna elements;
 mean interference power over one or more uplink antenna elements; or
 interference power based on uplink beamforming.

3. The method of claim 2, wherein at least one of:
 minimizing maximum interference power is based on a maximum interference power from one or more downlink antenna elements to a given uplink antenna element of the plurality of uplink antenna elements;
 minimizing mean interference power from one or more downlink antenna elements to a given uplink antenna element of the plurality of uplink antenna elements includes determining a mean interference power; or
 minimizing interference power includes applying uplink beamforming vector.

4. The method of claim 1, further comprising:
 selecting the at least one downlink beamforming coefficients vector from at least one codebook.

5. The method of claim 1, further comprising:
 receiving at least one index of the at least one downlink beamforming coefficients vector in a channel state information report from a user equipment.

6. The method of claim 1, wherein the selected configuration comprises at least one of the following:
 an antenna array configuration in uplink slots, downlink slots, and flexible slots comprising two configurations.

7. The method of claim 1, wherein the selected configuration comprises an enumeration of antenna elements in subband non-overlapping full duplex slots.

8. The method of claim 7, wherein the enumeration of antenna elements in downlink and uplink subsets is independent.

9. An apparatus comprising:
 a processor configured to:
 determine an interference channel matrix of an antenna array having a plurality of uplink antenna elements and a plurality of downlink antenna elements;
 determine an untransformed beamforming coefficients vector;
 determine a transformed beamforming coefficients vector using the untransformed beamforming coefficients vector and the interference channel matrix;
 determine an interference of the plurality of the uplink antenna elements and the plurality of the downlink antenna elements using the transformed beamforming coefficients vector and determine a power of the interference of the plurality of the uplink antenna elements and the plurality of the downlink antenna elements;
 determine a maximum interference of the antenna array based on the determined power of the interference;
 in response to the maximum interference being less than or equal to a predefined target maximum interference, operate the antenna array based on the transformed beamforming coefficients vector, and
 in response to the maximum interference being greater than a predefined target maximum interference, determine a new transformed beamforming coefficients vector using the transformed beamforming coefficients vector and the interference channel matrix.

10. The apparatus of claim 9, wherein the processor is configured to calculate the transformed beamforming coefficients vector by minimizing at least one of the following:
 maximum interference power over one or more uplink antenna elements;
 mean interference power over one or more uplink antenna elements; or
 interference power based on uplink beamforming.

11. The apparatus of claim 10, wherein the processor is configured to at least one of:
 minimize maximum interference power based on a maximum interference power from one or more downlink antenna elements to a given uplink antenna element of the plurality of uplink antenna elements;
 minimize mean interference power from one or more downlink antenna elements to a given uplink antenna element of the plurality of uplink antenna elements, by determining a mean interference power; or
 minimize interference power by applying uplink beamforming vector.

12. The apparatus of claim 9, wherein the processor is further configured to select the at least one downlink beamforming coefficients vector from at least one codebook.

13. The apparatus of claim 9, wherein the processor is further configured to receive at least one index of the at least one downlink beamforming coefficients vector in a channel state information report from a user equipment.

14. The apparatus of claim 9, wherein the selected configuration comprises at least one of the following:
 an antenna array configuration in uplink slots, downlink slots, and flexible slots comprising two configurations.

15. The apparatus of claim 9, wherein the selected configuration comprises an enumeration of antenna elements in subband non-overlapping full duplex slots.

16. The apparatus of claim 15, wherein the enumeration of antenna elements in downlink and uplink subsets is independent.

17. A non-transitory computer readable medium comprising program instructions that, when executed by a processor, cause the processor to:
- determine an interference channel matrix of an antenna array having a plurality of uplink antenna elements and a plurality of downlink antenna elements;
- determine an untransformed beamforming coefficients vector;
- determine a transformed beamforming coefficients vector using the untransformed beamforming coefficients vector and the interference channel matrix;
- determine an interference of the plurality of the uplink antenna elements and the plurality of the downlink antenna elements using the transformed beamforming coefficients vector and determine a power of the interference of the plurality of the uplink antenna elements and the plurality of the downlink antenna elements;
- determine a maximum interference of the antenna array based on the determined power of the interference; and
- in response to the maximum interference being less than or equal to a predefined target maximum interference, operate the antenna array based on the transformed beamforming coefficients vector, and
- in response to the maximum interference being greater than a predefined target maximum interference, determine a new transformed beamforming coefficients vector using the transformed beamforming coefficients vector and the interference channel matrix.

* * * * *